3,188,309
PROCESS FOR PREPARING ORGANO-PHOSPHATE ESTERS
Teruaki Mukaiyama, Tokyo, and Tsujiaki Hata, Yokosuka-shi, Japan, assignors to Asahi Kasei Kogyo Kabushiki Kaisha, Osaka, Japan, a corporation of Japan
No Drawing. Filed Apr. 1, 1963, Ser. No. 269,717
Claims priority, application Japan, Mar. 31, 1962, 37/12,131
10 Claims. (Cl. 260—211.5)

This invention relates to a process for preparing phosphates.

The invention is concerned primarily with processes for preparing phosphates of the compounds containing a hydroxyl group and phosphoramidate of the compounds containing amino group under the presence of mono- or dihalogen substituents of active methylene compounds.

The process of this invention can be expressed by the following general equation:

$$R'O-\overset{\overset{R^2}{\overset{\|}{O}}}{P}-OR^3 + R^4OH + ACHXCOY \text{ (or } \tfrac{1}{2}ACX_2COY\text{)} \longrightarrow$$

$$R^4O-\overset{O}{\underset{\|}{P}}\diagdown\!\!\diagup\overset{OR^2}{OR^3} + R^1X + ACH_2COY \text{ (} \tfrac{1}{2}ACH_2COY\text{)}$$

$$R'O-\overset{\overset{R^2}{\overset{\|}{O}}}{P}-OR^3 + R^5R^6NH + ACHCOY \text{ (or } \tfrac{1}{2}ACX_2COY\text{)} \longrightarrow$$

$$R^5R^6N-\overset{O}{\underset{\|}{P}}\diagdown\!\!\diagup\overset{OR^2}{OR^3} + R^1X + ACH_2COY \text{ (} \tfrac{1}{2}ACH_2COY\text{)}$$

wherein
$R^1$ is alkyl or aralkyl radicals, $R^2$ and $R^3$ are alkyl, aralkyl or aryl radicals. $R^4$ and $R^5$ are radicals from any organic compound and $R^6$ is hydrogen or alkyl, aralkyl or aryl radicals.
A is an atomic group with a large electro-negativity such as CN, $NO_2$, $R^7NHCO$, $COOR^7$, etc.
X is halogen (Br, Cl, I)
Y is $NHR^7$ or $OR^7$
and
$R^7$ is hydrogen or alkyl, aralkyl or aryl radicals.

As will be apparent from the above formula, the process of this invention includes the preparation of 5′-guanylic acid and 5′-inosinic acid which are used as food flavorings, and other biochemical or pharmaceutical important phosphates of carbohydrates, nucleosides, sterols, terpene alcohols and vitamines.

It has been well-known that the enol-phosphates formed from trialkyl phosphites and $\alpha$-haloketones or $\alpha$-haloaldehydes by the Perkow reaction do not further react with the trialkyl phosphites but react exclusively with nucleophilic reagents such as alcohols or amines to make trialkyl phosphates or trialkyl phosphoramidates.

Any of the enol-phosphates obtained by the Perkow reaction up to the present time, however, has not been applied industrially as phosphorylating agents for alcohols and amines especially for naturally occurring compounds such as carbohydrates, nucleosides, sterols, terpene alcohols and vitamines because they are prepared under severe conditions and are sluggish toward nucleophilic reagents. (J. F. Allend and O. H. Johnson, J. Am. Chem. Soc., 77, 2871 (1955).)

This invention primarily affords a commercial way to prepare the phosphates of naturally occurring compounds such as carbohydrates, nucleosides, sterols, terpene alcohols and vitamines, which have received attention as food flavors, anti-cancer agents, biochemical reagents, and medicines. The excellent methods for this purpose are found by studying the Perkow reaction.

This invention concerns processes to react the compounds having a hydroxyl, amino group with phosphites according to the general formula $$R^1O-\overset{\overset{R^2}{\overset{\|}{O}}}{P}-OR^3$$

under the presence of mono- or di-halogen derivatives of active methylene compounds and to prepare their phosphates or phosphoramidate quantitatively. The chemical reaction of this invention proceeds as follows:

$$\begin{array}{c} ACHXCOY \\ + \\ R^2 \\ \overset{\|}{O} \\ R^1O-\overset{\|}{P}-OR^3 \end{array} \longrightarrow \begin{array}{c} ACH=C-Y \\ \overset{|}{O} \\ R^2O-\overset{\|}{P}-OR^3 \\ \overset{\|}{O} \end{array} \overset{HZ}{\longrightarrow} \begin{array}{c} ACH_2COY \\ + \\ O\diagdown\!\!\diagup OR^2 \\ Z-\overset{\|}{P} \\ + \diagdown OR^3 \\ R^1X \end{array}$$

(wherein Z is $R^4O$ or $R^5R^6N$)

The reaction proceeds through the initial formation of the enol-phosphates by the interaction of mono- or dihalogen derivatives of active methylene compounds with phosphites, followed by the attack of nucleophilic reagents to form phosphates or phosphoramidates.

The above phosphites in this invention are trialkyl phosphates consisting of methyl, ethyl, n- or iso-propyl, or n- or iso-butyl, tribenzyl phosphite are generally used, because they are inexpensive and their suitable boiling point makes the processes of the phosphorylation simple. In some purpose, the phosphites substituted by different groups such as mono-ethyl bis-(p-nitrophenyl)phosphites are used.

As the halogen derivatives of active methylene compounds in this invention, any of the halogens, is employed. Generally, bromine or chlorine derivatives of cyanoacetamide, malonamide, alkyl cyanoacetate (wherein alkyl is $C_1$–$C_4$) or N-cyclohexyl cyanoacetamide are suitable.

As the compounds having a hydroxy group, aliphatic alcohols consisting of $C_1$–$C_{18}$ such as methyl, ethyl, lauryl, cetyl, etc., aromatic alcohols such as phenol, araliphatic alcohols such as benzyl, carbohydrates such as glucose, fructose, ribose, xylose, etc., nucleosides such as adenosine, guanosine, inosine, uridine, cytidine, and those protected their hydroxyl groups at 2′ and 3′ position with an actyl, benzylidene, or isopropylidene group, sterols such as cholesterol, ergosterol or testosterone, terpene alcohols such as borneol or methol, vitamines such as $A_1$, $A_2$, $B_1$, $B_2$, $B_6$ or C are used.

As the compounds having an amino group, aliphatic amines or imines consisting of $C_1$–$C_{18}$ such as methyl, ethyl, lauryl, cetyl, etc., or aromatic amines such as aniline or N-substituted aniline are used.

In carrying out this invention, generally, one mole of the above phosphites and one mole of the above compounds having a hydroxyl, amino group are dissolved to the solvent in different container, to either of which one or more kinds of the above halogen derivatives of the active methylene compounds is added in equivalent amount to halogen. These solutions are mixed at a suitable temperature and kept for a suitable period at room temperature. After filtering off a white precipitate which is active methylene compounds, the phosphates are collected by distillation, solvent extraction or their combination. The active methylene compounds filtered off are recovered at 90–95% yield and re-halogenated to use them as the same purpose.

The reaction conditions such as reaction time and the reaction temperature required for this reaction are a function of reactants, a period of 1–2 hours at room temperature being required when the reactive reactants such as methyl or ethyl alcohol, phenol or aniline are employed. When less reactive reactants such as carbohydrates, nucleosides, vitamines, sterols or terpene alcohols are employed, however, a period of 24–48 hours at room temperature is suitable.

For carrying out this invention, any solvent which is inactive to the enol-phosphates formed by the Perkow reaction may be used. Generally, the solvents easily dissolving the reactants are employed such as ether, benzene, dioxane, N-dimethyl formamide or tetrahydrofuran.

Most of the halogen derivatives of active methylene compounds employed in this invention shown as the general formula ACHXCOY, ACX$_2$COY are superior to ethyl monobromomalonate in the following respects.

(1) The separation of products from by-products and reactants is easier.

(2) The reaction can be carried out at lower temperatures.

Furthermore, this invention has the advantage of preparing phosphates by a one step process in which the compounds having a hydroxyl or an amino group are reached with phosphites in the presence of halogen derivatives of active methylene compounds without isolating the intermediate "enol-phosphate" in which enol-phosphate was isolated.

Compared with other known methods using inorganic or organic phosphorylating agents, the present invention is preferable because easily produced phosphites are used, and recovery and cyclization of the halogen derivatives of active methylene compounds can be done more effectively.

In addition to these advantages, the process of this invention has one further advantage in that it does not produce the side-reaction such as the formation of symmetrical pyrophosphates or phosphates (for example cyclic phosphates) which is observed in the carbodiimide-method.

The following examples are illustrative of this invention:

Example 1

To 0.28 gram of ethyl alcohol and 1.0 gram of α-monobromocyanoacetamide in 90 ml. of dry ether at −50° C. was added dropwise slowly 1.0 gram of triethyl phosphite dissolved in 10 ml. of ether. White precipitate, cyanoacetamide, separated soon and the solution was kept for an additional hour at room temperature and was filtered. After removal of ether and ethyl bromide, 1.0 gram (yield 91%) triethyl phosphate was obtained. (B.P. 65–67° C./1 mm.)

Example 2

From 0.20 gram of methyl alcohol, 0.37 gram of n-propyl alcohol or 0.58 gram of phenol, the corresponding phosphates, methyldiethyl (yield 77%, B.P. 102–104° C./25 mm.), n-propyl-diethyl (yield 85%, B.P. 73–74° C./0.8 mm.) or phenyl diethyl (yield 72%, B.P. 103–120° C./1 mm.) phosphate were prepared exactly as in Example 1.

Example 3

To 1.0 gram of α-monobromocyanoacetamide in 90 ml. of ether kept at −50° C. were added dropwise slowly 10 ml. of dry ether solution containing 0.57 gram of aniline and 1.0 gram of triethylphosphite. After treating exactly as in Example 1, ether and ethyl bromide were distilled out. 1.3 grams of diethyl-N-phenyl phosphoroamidate were collected and recrystallized from benzene (yield 93%, M.P. 94–95° C.).

Example 4

Treatment of 8.9 grams of ethyl alcohol, 2.4 grams of α-dibromocyanoacetamide and 3.3 grams of triethyl phosphite exactly as in Example 1 gave 2.6 grams of triethyl-phosphate (yield 72%, B.P. 94–95° C./11–12 mm.).

Example 5

To 1.63 grams of α-bromocyanoacetamide and 0.25 gram of ethyl alcohol in 30 ml. of tetrahydrofuran at −78° C. was added dropwise slowly 20 ml. of tetrahydrofuran solution containing 1.76 grams of triethyl phosphite. After treating exactly as in Example 1, tetrahydrofuran and ethylbromide were distilled out. 1.85 grams of monoethyl-bis-p-nitrophenyl phosphate were obtained (yield 51%, M.P. 135° C.).

Example 6

To 2.45 grams of N-cyclohexyl α-monobromocyanoacetamide dispersed into 20 ml. of tetrahydrofuran was added dropwise a mixture of 1.24 grams of triethyl phosphite and 20 ml. of ethyl alcohol at room temperature. After keeping it over-night, the reaction mixture was concentrated. Adding ether to filtrate, followed by concentration, 1.21 grams (yield 89%) of triethyl phosphate were collected by distillation under vacuum.

Example 7

Treatment of 1.39 grams of p-nitrophenol with 1.66 grams of triethyl phosphite and 2.45 grams of N-cyclohexyl α-monobromocyanoacetamide as in Example 6 gave 2.31 grams (yield 84%) of diethyl mono-p-nitrophenyl phosphate (B.P. 160–162° C./0.5 mm.).

Example 8

Treatment of 0.9 gram of ethyl alcohol with 3.3 grams of triethyl phosphite and any one or the mixture of the following compounds—2.6 grams of dibromomalonamide, 2.4 grams of α-monochlorocyanoacetamide, 1.5 grams of α-dichlorocyanoactamide, 2.7 grams of monochloromalonamide and 1.7 grams of dichloromalonamide exactly as in Example 1 gave 2.6–3.2 grams of triethyl phosphate (yield 72–94%).

Example 9

Dry ether solution containing 0.92 gram of ethyl alcohol, 3.3 grams of triethyl phosphite and 3.84 grams of ethyl α-monobromocyanoacetate were refluxed for 30 minutes, and treated exactly as in Example 1. 1.9 grams of triethyl phosphate were obtained (yield 61%).

Example 10

To 0.113 gram of α-monobromocyanoacetamide in dry ether was added dropwise an ether solution containing 0.2 gram of testosterone and 0.086 gram of triethylphosphite. The reaction mixture was kept for 24 hours at room temperature and white precipitate, cyanoacetamide was filtered off. Ether and ethyl bromide were removed to give 1.7 grams of dimethyl-17-testosterone-phosphate (yield 62%, M.P. 152° C.).

Example 11

To 15 ml. of N-dimethylformamide dissolved with 0.31 gram of 2',3'-O-isopropylidene adenosine and 0.44 gram of tribenzylphosphite were added dropwise 10 ml. of N-dimethylformamide containing 0.33 gram of α-monobromocyanoacetamide. The reaction mixture was kept for 24 hours at room temperature and the white precipitate, cyanoacetoamide was filtered off. After N-methylformamide and benzyl bromide were distilled out under vacuum, the residue dissolved in 30 ml. of 50% ethyl alcohol was hydrogenated under PdO$_2$ catalyst, followed by hydrolysis with 1/10 N sulfuric acid to give crude adenosine-5'-phosphate. Purification of this product was effected to derive therefrom barium salt, which was subjected to hydrolysis with diluted hydrochloric acid and recrystallized from 50% acetone to give 0.23 gram of pure adenosine 5'-phosphate (yield 66%, M.P. 196–198° C.).

Example 12

From 1.54 grams of borneol, 3.8 grams of tribenzyl phosphite and 1.63 grams of α-monobromoacetamide 1.4 grams of bornyl phosphate were prepared as in Example 11 (yield 68%, M.P. 155–156° C.).

What we claim is:

1. A process for producing a phosphate ester, which comprises reacting a phosphite represented by the formula:

$$R^1O-P(OR^2)-OR^3$$

wherein $R^1$, $R^2$ and $R^3$ are selected from the group consisting of alkyl groups having 1 to 4 carbon atoms, with an alcohol selected from the group consisting of aliphatic alcohols having 1 to 18 carbon atoms, phenol, and benzyl alcohol, in the presence of an active methylene compound selected from the group consisting of bromo and chloro derivates of N-cyclohexyl cyanoacetamide, cyanoacetamide, malonamide and alkyl cyanoacetates in which the alkyl group contains 1 to 4 carbon atoms in a solvent non-reactive to an enol-phosphate formed by the Perkow reaction to produce the corresponding phosphate ester.

2. A process according to claim 1, wherein said solvent is selected from the group consisting of ethers, benzene, dioxanes, N-dimethyl formamide, and tetrahydrofuran.

3. A process for producing a phosphate ester, which comprises reacting a phosphite having the formula:

$$R^1O-P(OR^2)-OR^3$$

wherein $R^1$, $R^2$ and $R^3$ are selected from the group consisting of alkyl groups having 1 to 4 carbon atoms, with a nucleoside selected from the group consisting of adenosine, guanosine and inosine in the presence of an active methylene compound selected from the group consisting of bromo- and chloro-derivatives of N-cyclohexyl cyanoacetamide, cyanoacetamide, malonamide and alkyl cyanoacetates in which the alkyl group contains 1 to 4 carbon atoms in a solvent non-reactive to an enol-phosphate formed by the Perkow reaction to produce the corresponding phosphate ester of the nucleoside.

4. A process according to claim 3, wherein said solvent is selected from the group consisting of ethers, benzene, dioxanes, N-dimethyl formamide and tetrahydrofuran.

5. A process for producing a phosphate ester comprising reacting a phosphite having the formula:

$$R^1O-P(OR^2)-OR^3$$

wherein $R^1$, $R^2$ and $R^3$ are selected from the group consisting of alkyl groups having 1 to 4 carbon atoms, with a compound selected from the group consisting of testosterone and borneol in the presence of an active methylene compound selected from the group consisting of bromo- and chloro-derivatives of N-cyclohexyl cyanoacetamide, cyanoacetamide, malonamide and alkyl cyanoacetates in which the alkyl group contains 1 to 4 carbon atoms in a solvent non-reactive to an enol-phosphate formed by the Perkow reaction to produce the corresponding phosphate ester of the compound.

6. A process according to claim 5, wherein said solvent is selected from the group consisting of ethers, benzene, dioxanes, N-dimethyl formamide, and tetrahydrofuran.

7. A process for producing a phosphate ester which comprises reacting a phosphite having the formula:

$$R^1O-P(OR^2)-OR^3$$

wherein $R^1$, $R^2$ and $R^3$ are selected from the group consisting of alkyl groups having 1 to 4 carbon atoms, with a compound selected from the group consisting of aliphatic amines having 1 to 18 carbon atoms, aniline, and N-substituted anilines in the presence of an active methylene compound selected from the group consisting of bromo- and chloro-derivatives of N-cyclohexyl cyanoacetamide, cyanoacetamide, malonamide and alkyl cyanoacetates in which the alkyl group contains 1 to 4 carbon atoms in a solvent non-reactive to an enol-phosphate formed by the Perkow reaction to produce the corresponding phosphate ester.

8. A process according to claim 7, wherein said solvent is selected from the group consisting of ethers, benzene, dioxanes, N-dimethyl formamide and tetrahydrofuran.

9. In a process wherein phosphite having the formula:

$$R^1O-P(OR^2)-OR^3$$

in which $R^1$, $R^2$, $R^3$ are selected from the group consisting of an alkyl having 1 to 4 carbon atoms, benzyl and p-nitrophenyl, and a member selected from the group consisting of aliphatic alcohols having 1 to 18 carbon atoms, phenol, and benzyl alcohol, aliphatic amine having 1 to 18 carbon atoms, aniline and N-substituted aniline are added to produce the corresponding phosphate esters, an improvement which comprises the addition at about −50° C. for 1–2 hours in the presence of at least one active methylene compound selected from the group consisting of bromo and chloro derivatives of cyanoacetamide, malonamide N-cyclohexyl cyanoacetamide and alkyl cyanoacetate which alkyl has 1 to 4 carbon atoms.

10. In a process wherein phosphite having the formula:

$$R^1O-P(OR^2)-OR^3$$

in which $R^1$, $R^2$, $R^3$ are selected from the group consisting of an alkyl having 1 to 4 carbon atoms, benzyl, and p-nitrophenyl, and a member selected from the group consisting of adenosine, guanosine, inosine, testosterone and borneol are added to produce corresponding phosphate esters, an improvement which comprises the addition at room temperature for 20–48 hours in the presence of at least one active methylene compound selected from the group consisting of chloro-cyanoacetamide, bromo-cyanoacetamide, cyclohexyl bromo-cyanoacetamide, cyclohexyl chloro-cyanoacetamide, alkyl chloro-cyanoacetate and alkyl bromo-cyanoacetate which alkyl has 1 to 4 carbon atoms.

References Cited by the Examiner

Cramer: "Angew. Chem." vol. 72, April 1960, pp. 236–249.

LEWIS GOTTS, *Primary Examiner.*